Dec. 23, 1958    P. H. MILLER    2,865,199
TESTING MACHINE FOR SHEET MATERIAL
Filed Dec. 13, 1955    2 Sheets-Sheet 1
Fig. 1
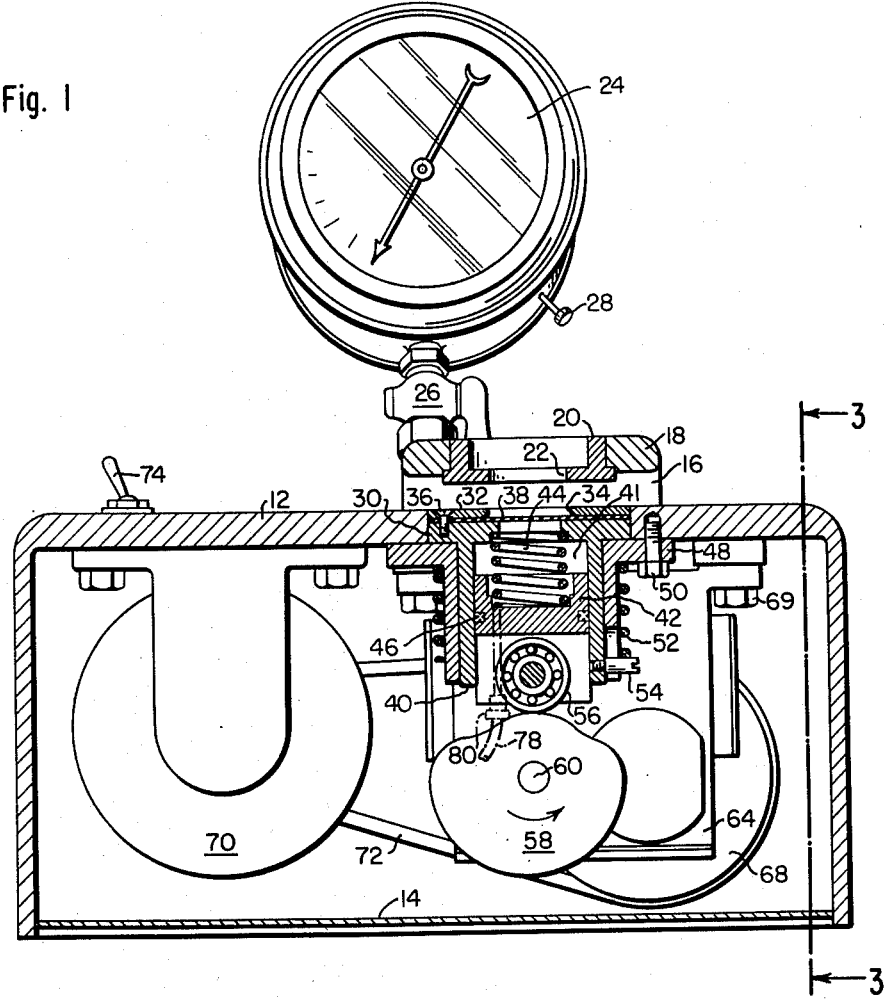
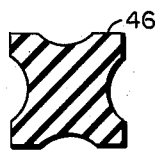
Fig. 2
INVENTOR.
PHILIP H. MILLER
BY
ATTORNEYS

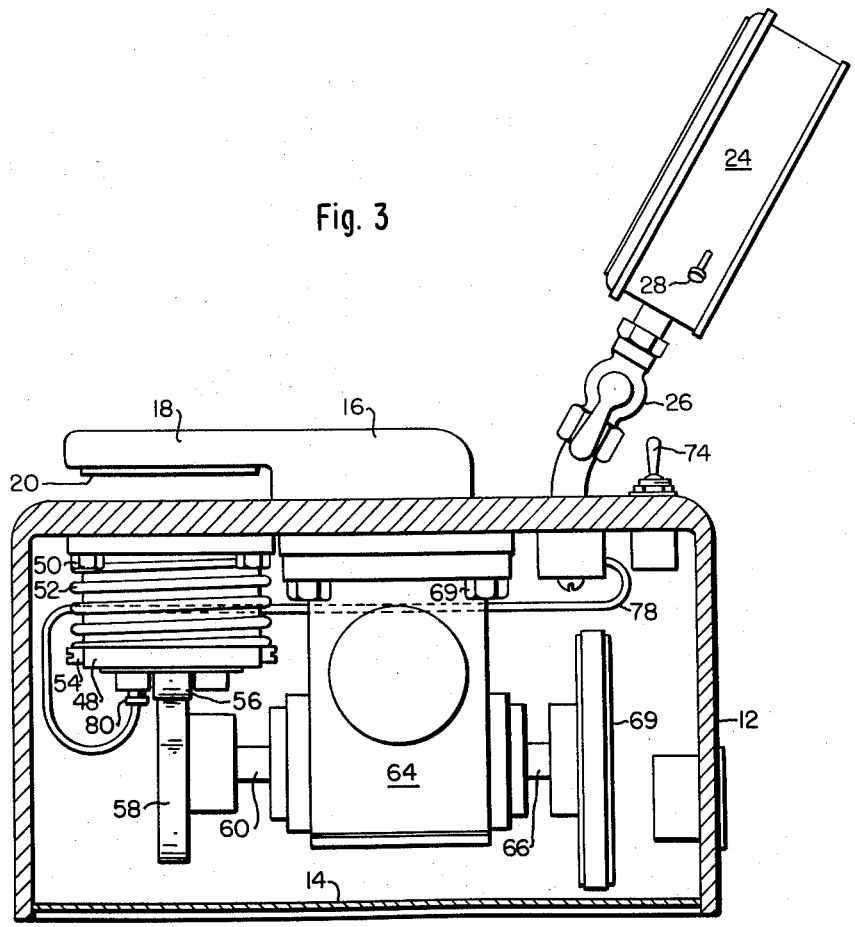

United States Patent Office 2,865,199
Patented Dec. 23, 1958

2,865,199

TESTING MACHINE FOR SHEET MATERIAL

Philip H. Miller, Lake Worth, Fla., assignor to Crosby Steam Gage & Valve Company, Wrentham, Mass., a corporation of Massachusetts Application December 13, 1955, Serial No. 552,856

8 Claims. (Cl. 73—102)

The present invention relates to a machine for testing the strength of sheet material. More particularly, it relates to a machine for making a standard test including the steps of clamping a specimen firmly between a clamping ring and a plate having a pair of aligned apertures, and applying fluid pressure behind an elastomeric diaphragm adjacent the plate to bulge it through the apertures, the pressure being increased until the specimen bursts in the region between the apertures. The strength of the specimen is measured in terms of the bursting pressure.

This application is a continuation-in-part of my copending application Serial No. 467,034, filed November 5, 1954, now Patent 2,727,386.

An object of this invention is to provide a testing machine of relatively small size and simple construction, which uniformly and accurately tests the specimens, thereby permitting closely similar pressure readings at the bursting point for samples of uniform strength. The ability of a machine to clamp each specimen and burst it in exactly the same way many times in succession enhances its usefulness by affording not only a true indication of the strength of each individual specimen, but also an indication of the uniformity in strength of a relatively large quantity of sheet material from a sampling thereof.

In connection with the foregoing object, it has been observed that many testing machines commonly in use are unsatisfactory by reason of their failure to clamp successive specimens, whether of the same or differing body and surface characteristics, with the same firmness and uniformity about their periphery. It will be readily appreciated that slippage at any point between the sample and the surfaces between which it is held, however slight, will tend to vary the pressure reading at the critical bursting point.

It will be further apparent that the clamping pressure exerted upon a specimen may be too high as well as too low. Excessively high pressures may tend to crush certain specimens, thus producing weak points resulting in premature failure under pressure, especially along the edges adjacent the apertures of the clamping ring and plate.

Ideally, the clamping pressure should bear a uniform relationship to the applied fluid pressure, and should increase as the applied pressure is increased.

Devices of this type involve an expansible fluid-filled chamber having an end wall with an aperture closed by the diaphragm. Much difficulty has been encountered in the past with conventional machines due to leakage of fluid from the chamber. It is a further object of this invention to provide an adequate seal which substantially eliminates this leakage. While the accuracy of a given reading on the pressure gauge at the moment of bursting of the sample is not directly affected by leakage of a small quantity of the fluid from the chamber, the necessity for frequent replenishment or replacement of fluid increases the possibility of introducing air bubbles into the chamber. These bubbles may become lodged in the vicinity of the diaphragm and disturb the uniformity of its action upon the specimens.

With the foregoing and other objects in view, the features of the invention include a structure by which the fluid pressure is utilized to clamp the specimen as well as to burst it. In this apparatus, as the pressure against the diaphragm is increased, the clamping pressure is also increased. To this end I provide a diaphragm and diaphragm plate movable against a fixed clamping ring and means forming an expansible fluid-filled chamber having an end wall secured to the plate, the wall having an opening closed by the diaphragm. I also provide means to increase the fluid pressure within the chamber, thus urging the above wall toward the clamping ring and bulging the diaphragm into the aperture of the ring.

According to another feature I provide a motor-operated cam mechanism to urge a piston mounted within a cylinder forming the fluid-filled chamber to vary the fluid pressure in a cyclic fashion, whereby the sample is first clamped between the diaphragm plate and clamping ring, and then a further increase in fluid pressure bulges the diaphragm until the specimen bursts.

Other features of the invention reside in certain details of construction, modes of operation and arrangements of the parts which will become evident from the following description of a preferred embodiment thereof, and from the appended drawings illustrating the same.

In the drawings,

Fig. 1 is a front elevation in section of the testing machine;

Fig. 2 is a view in section of the piston ring; and

Fig. 3 is a side elevation in section of the machine taken on line 3—3 in Fig. 1.

Referring to the drawings, there is provided a rigid frame 12, preferably of metal, with integral rectangular side and upper walls and a removable bottom plate 14.

Supported in and securely fastened to the upper wall is a bracket 16 having an arm 18 extending therefrom toward the front of the machine. A clamping ring 20 is securely fitted within a circular aperture in the arm 18, this ring being provided with an aperture 22. The aperture 22 is circular and is preferably formed and dimensioned in accordance with accepted standards for machines of this type.

A pressure gauge 24 having a shut-off valve 26 is supported immediately behind the bracket 16 with its dial clearly visible from the front of the machine. The valve 26 is normally left open during the testing of samples, and is included with the machine to facilitate filling with fluid.

The gauge 24 is of the maximum reading type; that is, its pointer remains in the position indicating the maximum pressure reached prior to operation of a reset pin 28.

The frame 12 has an aperture immediately beneath the clamping ring 20, in which is slidably fitted a head member 30. A diaphragm plate 32 having a central aperture 34 is secured to the head member 30 by a number of screws such as 36, and thus retains a rubber diaphragm 38. Preferably, the lower edge of the aperture 34 adjacent the diaphragm is slightly rounded to prevent abrasion of the diaphragm.

The head member 30 has a downwardly extending cylindrical wall 40 forming an expansible chamber 41 in which is slidably fitted a piston member 42. A spring 44 in compression urges the piston in the direction to expand the space volume within the cylinder. The cylinder is completely filled with a suitable hydraulic fluid such as a commercial anti-freeze solution, and the piston has a suitable sealing ring 46 called a "Quad" ring, shown in detail in Fig. 2. The ring is preferably made of rubber or equivalent elastomeric material, or of fibrous composition. In cross section, it is essentially square with a circular flute in each of the four sides. When assembled, the ring is retained under slight compression with the flutes forming spaces into which the compressed material may expand upon compression.

A flanged outer cylinder 48 is securely fastened to the underside of the upper wall of the frame 12 by screws such as 50. This cylinder forms a sleeve bearing for the cylindrical portion 49 of the head member 30. A compression spring 52 bearing at one end upon the flanged member 48 is engaged at the other end with a pin 54 threaded into the cylindrical portion 49. The pin 54 moves freely in a slot in the member 48. Thus the head is normally urged downwardly by the spring 52.

The piston 42 has a diametral slot in its lower surface, in which a roller bearing 56 is rotatably supported. The bearing rests upon a cam 58 secured to a shaft 60. This shaft extends from a reduction gear assembly 64 having an input shaft 66 driven by a pulley 68. The assembly 64 is secured to the underside of the upper wall of the frame 12 by suitable screws 69. The pulley 68 is driven by a motor 70 through a flexible V-belt 72. The motor 70 can be turned "on" or "off" by a switch 74 mounted in the upper wall of the machine.

The pressure gauge 24 is filled with fluid and communicates with the interior of the cylinder 40 through a tube 78, one end of the tube having a fitting 80 threaded into a hole in the piston 42.

The machine as illustrated in the drawings is in the normal position for initiation of a test cycle. The bearing 56 rests upon a "dwell" portion of the cam 60. The expansible chamber 41 is at maximum volume, the gauge 24 is reset to its "zero" reading and the head 30 is closely adjacent to the shoulder of the flanged bearing member 48. With the parts in these positions, a test specimen is inserted in the space between the clamping ring 20 and the diaphragm plate 32.

To accomplish the test, the switch 74 is closed to cause the motor 70 to turn the cam 58 through the reduction gear assembly 64. The direction of rotation is that indicated by the arrow in Fig. 1.

The springs 44 and 52 are under predetermined initial compression loads at the start of the cycle. During approximately the first quarter revolution of the cam 58, the piston 42 and the head member 30 move upward together, compressing the spring 52. The spring 44 is stiffer than the spring 52, and during this initial movement is restrained at its upper end only by the spring 52 and the weight of the member 30, the diaphragm and the plate. It is therefore but slightly compressed until the plate 32 reaches the ring 20.

By the end of the first quarter revolution the plate 32 reaches the ring 20 and begins to press upon it, thereby holding the specimen in position. Thereafter, further upward movement of the piston 42 causes compression of the spring 44 and increases the fluid pressure within the chamber 41.

The increasing pressure within the chamber 41 produces two effects: first, it bears upon the end wall of the cylinder formed by an inwardly projecting annular flange of the head member 49, producing a force tending to urge the diaphragm plate 32 against the ring 20 with a force increasing with the pressure; and second, it bulges the diaphragm 38 upwardly against the specimen. Eventually, the specimen bursts, and the gauge 24 registers the pressure at which this occurs. The apparatus automatically returns to the initial position and begins a new cycle.

To burst a typical specimen, the apparatus is so constructed that the piston 42 preferably moves no more than a quarter of an inch in a full cycle and the area against which the clamping pressure is effective is preferably, although by no means necessarily, three times the effective area operative upon the diaphragm 38. Thus the force tending to clamp the specimen in position is three times the upward force exerted upon the specimen by the diaphragm.

According to a variation of the described structure, I may provide control means of a well-known type, preferably including a microswitch actuated by a portion of the cam 58 or some part connected therewith, to cause the apparatus to move through one complete cycle after the switch 74 is closed, and then to stop. It will be understood that the mechanism for imparting motion to the piston 42 may also be modified in accordance with methods now well understood in the art.

While I have described the invention with reference to a preferred embodiment thereof, it will be understood that the foregoing and other variations in design, structure and arrangements of the parts may be accomplished by one skilled in the art upon a reading of the foregoing specification without departing from the spirit or scope of the invention.

Having thus described the invention, I claim:

1. A strength testing machine for sheet material having, in combination, a frame, a clamping ring mounted on the frame, a movable assembly supported in the frame including a fluid-filled cylinder, a piston, a diaphragm plate secured to the cylinder and movable against the ring to clamp a specimen thereagainst, an elastomeric diaphragm retained by the plate, the cylinder having an end wall with an opening closed by the diaphragm, and means for moving the piston to increase the fluid pressure in the cylinder to urge the plate against the ring and to expand the diaphragm outwardly toward the ring.

2. A strength testing machine for sheet material having, in combination, a frame, a clamping ring and a sleeve bearing mounted on the frame, a fluid-filled cylinder guided within the bearing, a piston, a diaphragm plate secured to the cylinder and movable against the ring to clamp a specimen thereagainst, an elastomeric diaphragm retained by the plate, the cylinder having an end wall with an opening closed by the diaphragm, and means for moving the piston to increase the fluid pressure in the cylinder to urge the plate against the ring and to expand the diaphragm outwardly toward the ring.

3. A strength testing machine for sheet material having, in combination, a frame, a clamping ring, a sleeve bearing and a pressure gage mounted on the frame, a fluid filled cylinder guided within the bearing and connected with the pressure gage, a piston, a diaphragm plate secured to the cylinder and movable against the ring to clamp a specimen thereagainst, an elastomeric diaphragm retained by the plate, the cylinder having an end wall with an opening closed by the diaphragm, and means for moving the piston to increase the fluid pressure in the cylinder to urge the plate against the ring and to expand the diaphragm outwardly toward the ring.

4. A strength testing machine for sheet material having, in combination, a frame, a clamping ring mounted on the frame, a movable assembly supported in the frame including a fluid-filled cylinder, a piston, a diaphragm plate secured to the cylinder and movable against the ring to clamp a specimen thereagainst, an elastomeric diaphragm retained by the plate, the cylinder having an end wall with an opening closed by the diaphragm, and a cam engaged with the piston and revolved in a cycle to vary the pressure in the cylinder to urge the plate against the ring, to expand the diaphragm with increasing pressure outwardly toward the ring, and to permit the return of the plate to its original position.

5. A strength testing machine for sheet material having, in combination, a frame, a clamping ring mounted on the frame, an assembly supported for movement relative to the frame including means forming an expansible fluid-filled chamber, said chamber having relatively movable ends including a first end having an opening therein, said assembly also including an elastomeric diaphragm closing said opening and a diaphragm plate secured over the diaphragm to said first end and adapted for movement toward the ring to clamp a specimen thereagainst, and means reacting against said frame and bearing upon the other of said ends to increase the fluid pressure in the chamber, to urge the plate against the ring and to expand the diaphragm outwardly toward the ring.

6. A strength testing machine for sheet material having, in combination, a frame, a clamping ring mounted on the frame, an assembly supported for movement relative to the frame including means forming an expansible fluid-filled chamber, said chamber having relatively movable ends including a first end having an opening therein, said assembly also including an elastomeric diaphragm closing said opening and a diaphragm plate secured over the diaphragm to said first end and adapted for movement toward the ring to clamp a specimen thereagainst, and means reacting against said frame and bearing upon the other of said ends to urge it toward said first end and thereby to increase the fluid pressure in the chamber, said plate being urged against the ring and said diaphragm being expanded outwardly toward the ring.

7. A strength testing machine for sheet material having, in combination, a frame, a clamping ring and a sleeve bearing mounted on the frame, a movable assembly guided within the bearing including means forming an expansible fluid-filled chamber, said chamber having relatively movable ends including a first end having an opening therein, said assembly also including an elastomeric diaphragm closing said opening and a diaphragm plate secured over the diaphragm to said first end and adapted for movement toward the ring to clamp a specimen thereagainst, and means reacting against said frame and bearing upon the other of said ends to increase the fluid pressure in the chamber, to urge the plate against the ring and to expand the diaphragm outwardly toward the ring.

8. A strength testing machine for sheet material having, in combination, a frame, a clamping ring and a sleeve bearing mounted on the frame, a head member slidably supported within the bearing and having an opening therein, an elastomeric diaphragm closing said opening, a diaphragm plate secured over the diaphragm to said head member and adapted for movement toward the ring to clamp a specimen thereagainst, means forming an expansible fluid-filled chamber communicating with said opening and having an end movable in relation to said head member, and means reacting against said frame and bearing upon said end to increase the fluid pressure in the chamber, to urge the plate against the ring and to expand the diaphragm outwardly toward the ring.

References Cited in the file of this patent

UNITED STATES PATENTS

| | | |
|---|---|---|
| 1,174,251 | Hankins et al. | Mar. 7, 1916 |
| 2,186,213 | Senna | Jan. 9, 1940 |
| 2,518,959 | Tinker | Aug. 15, 1950 |